(12) United States Patent
Heuer et al.

(10) Patent No.: US 7,199,208 B2
(45) Date of Patent: Apr. 3, 2007

(54) POLYFORMALS AND COPOLYFORMALS WITH REDUCED WATER ABSORPTION, PRODUCTION AND USE THEREOF

(75) Inventors: Helmut-Werner Heuer, Krefeld (DE); Rolf Wehrmann, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 10/894,973

(22) Filed: Jul. 20, 2004

(65) Prior Publication Data
US 2005/0020802 A1 Jan. 27, 2005

(30) Foreign Application Priority Data
Jul. 25, 2003 (DE) ................. 103 33 928

(51) Int. Cl.
*C08G 64/00* (2006.01)
(52) U.S. Cl. ............ 528/196; 264/176.1; 264/219; 359/642; 528/126; 528/174; 528/198; 528/205; 528/219
(58) Field of Classification Search ............ 264/176.1, 264/219; 359/642; 528/126, 174, 196, 198, 528/205, 219
See application file for complete search history.

(56) References Cited

U.S. PATENT DOCUMENTS

| | | | |
|---|---|---|---|
| 4,260,733 A * | 4/1981 | Loucks et al. | 528/219 |
| 4,374,974 A | 2/1983 | Hay | 528/219 |
| 4,801,679 A * | 1/1989 | Shigematsu et al. | 528/219 |
| 5,105,004 A | 4/1992 | Reuter et al. | 558/389 |

FOREIGN PATENT DOCUMENTS

CA 1 117247 1/1982

OTHER PUBLICATIONS

Patent Abstracts of Japan Bd. 010, Nr. 036 (C-328), Feb. 13, 1986 & JP 60 188426 A (Idemitsu Kosan KK), Sep. 25, 1985.
Patent Abstracts of Japan Bd. 015, Nr. 504 (C-0896) Dec. 19, 1991 & JP 03 221523 A (Idemitsu Kosan Co Ltd), Sep. 30, 1991.

* cited by examiner

*Primary Examiner*—Terressa Boykin
(74) *Attorney, Agent, or Firm*—Joseph C. Gil; Aron Preis (57) ABSTRACT

A thermoplastic molding composition comprising a linear (co)polyformal is disclosed. The (co)polyformal corresponds to formulae (Ia) or (Ib),

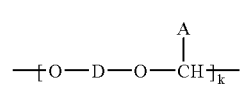

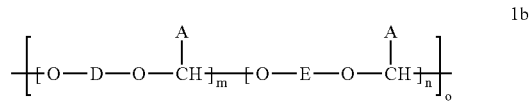

in which A independently denotes hydrogen or phenyl, —O-D-O— and —O-E-O— independently denote a diphenolate residue, in which -E- and -D- independently denote an aromatic radical having 6 to 40 C atoms, wherein at least one of —O-D-O— and —O-E-O— denotes 1,1-bis(4-hydroxyphenyl)cyclohexane residue. The composition is characterized in its restricted water absorption. Also disclosed is a process for the preparation of the composition.

6 Claims, 1 Drawing Sheet

Water absorption of polyformals in comparison with polycarbonate

Fig. 1

POLYFORMALS AND COPOLYFORMALS WITH REDUCED WATER ABSORPTION, PRODUCTION AND USE THEREOF

FIELD OF THE INVENTION

The invention is directed to thermoplastic molding compositions and more particularly to (co)polyformals.

SUMMARY OF THE INVENTION

A thermoplastic molding composition comprising a linear (co)polyformal is disclosed. The (co)polyformal corresponds to formulae (Ia) or (Ib), in which A independently denotes hydrogen or phenyl, —O-D-O— and —O-E-O-independently denote a diphenolate residue, in which -E- and -D- independently denote an aromatic radical having 6 to 40 C atoms, wherein at least one of —O-D-O— and —O-E-O— denotes 1,1-bis(4-hydroxyphenyl)cyclohexane residue. The composition is characterized in its restricted water absorption. Also disclosed is a process for the preparation of the composition.

TECHNICAL BACKGROUND OF THE INVENTION

Aromatic polycarbonates belong to the group of engineering thermoplastics. They are distinguished by the combination of the properties transparency, heat resistance and toughness which are significant in engineering applications. High molecular weight linear polycarbonates are obtained by the phase boundary process by reacting the alkali metal salts of bisphenol A with phosgene in the two-phase mixture. Molecular weight may be controlled by the quantity of monophenols, such as for example phenol or tert.-butylphenol. These reactions virtually exclusively yield linear polymers. This may be demonstrated by end group analysis. Aromatic polycarbonates based on bisphenol A are in particular also used for the production of optical data storage media. They may, however, also absorb up to 0.34 wt. % of water, which has an unfavorable effect on the dimensional stability of data storage media. In other, especially external, applications, hydrolysis is a certain problem. The problem of hydrolysis resistance also arises in connection with use as steam-sterilizable medical articles.

On the basis of prior art, it has accordingly long been an object to provide a material which has the typical advantages of polycarbonate as an engineering thermoplastic, but which does not exhibit the above-stated disadvantages.

It has now surprisingly been found that certain polyformals and copolyformals are such materials.

Aromatic polyformals are also transparent thermoplastics which are synthesised from bisphenol structural units. In contrast with polycarbonates, however, the link between the bisphenol structural units does not consist of carbonate units, but instead of full acetal units. While in polycarbonate, phosgene serves as the carbonate source for the linkage, in polyformals, methylene chloride, for example, performs the function as the source of the full acetal linking unit during polycondensation. Polyformals may accordingly also be viewed as polyacetals.

In contrast with polycarbonates, aromatic polyformals may be produced in a homogeneous phase of bisphenol A and methylene chloride in the presence of alkali metal hydroxides.

In this polycondensation reaction, methylene chloride simultaneously acts as reactant and solvent. In the same manner as during polycondensation of polycarbonate, molecular weight may again be controlled by the quantities of monophenol used.

U.S. Pat. No. 4,374,974 has already described a process in which linear and cyclic oligo- and polyformals may be obtained starting from specific bisphenols after reaction with methylene chloride. One drawback of the materials obtainable in said process is their relatively high content of several percent of cyclic reaction products, which has a very disadvantageous impact on mechanical properties. Moreover, the described polyformals exhibit very unfavorable swelling characteristics in organic solvents, which make subsequent removal of the unwanted cyclic constituents virtually impossible.

DE A 27 38 962 and DE A 28 19 582 describe further and similar polyformals and the use thereof as coatings or films, with the above-stated disadvantages.

EP A 0277 627 describes polyformals based on specific bisphenols of the formula and the possible use thereof as materials for optical instruments. In said application, substitution of the bisphenols on the aryl residues is described as mandatory in order to force the optical anisotropy of the polyformals into a range suitable for optical applications.

The polyformals previously described in the prior art and the properties thereof or their production processes are, however, unsatisfactory or have the disadvantage that there are limits to the achievable purities of linear polymer. The materials exhibit inadequate mechanical properties, which is, for example, manifested in elevated brittleness.

The prior art makes no disclosure as to the surprisingly and unusually low water absorption of polyformals, which makes polyformals of particular interest as engineering materials, in particular for optical data storage media.

DETAILED DESCRIPTION OF THE INVENTION

The object therefore arose of providing high molecular weight polyformals and copolyformals and a process for the production thereof which, for certain applications, avoid the disadvantages known from the prior art. Said object is surprisingly achieved by the use of certain bisphenols, and by the polyformals and copolyformals according to the invention obtainable thereby and the production process therefor.

It has surprisingly also be found that the polyformals obtained exhibit distinctly lower water absorption values than do prior art polycarbonates. This is of particular significance for the production of data storage media, such as for example DVD and DVD-R and other high-density storage systems, such as Blu-ray discs (BD) and Advanced Optical Discs (AOD), and for near-field optics. Improved dimensional stability, which is increasingly important for the use of blue or blue-green lasers, is consequently possible. Thanks to the materials' favorable dissolution or swelling characteristics, any cyclic impurities which do occur may be almost entirely removed, after which they are only present in the same order of magnitude as in today's usual grades of polycarbonates. This virtually rules out any negative influence on mechanical properties by cyclic impurities. It has moreover surprisingly been found that elevated glass transition temperatures of 130–170° C. may be achieved by means of suitable copolymer compositions, said temperatures being necessary for engineering applications, for example as optical data storage media or steam-sterilizable medical articles.

For full acetals, which is what these polymers must be considered, these polyformals completely unexpectedly also exhibit extreme hydrolysis stability at relatively high temperatures in both an alkaline and acidic medium. It is moreover found that, even when subjected to the boiling test in water, the polymers are considerably more stable than polycarbonate.

The present invention accordingly provides the use of linear polyformals or copolyformals for the production of optical data storage media and medical articles, or the copolyformals themselves, on the basis of aromatic bisphenols, represented by way of non-limiting example by the general formulae (3a) and (3b), (3a)

(3b)

in which A independently denotes hydrogen or phenyl, preferably hydrogen, —O-D-O— and —O-E-O— denote any diphenolate residue, in which -E- and -D- are mutually independently an aromatic groups with 6 to 40 C atoms, preferably 6 to 21 C atoms, which group may contain one or more aromatic or fused aromatic nuclei that may contain heteroatoms and may be substituted with $C_1$–$C_{12}$ alkyl radicals, preferably with $C_1$–$C_8$ alkyl radicals, or halogen and may contain aliphatic radicals, cycloaliphatic radicals, aromatic nuclei or heteroatoms, preferably aliphatic or cycloaliphatic radicals, wherein at least one of —O-D-O— and

—O-E-O— denotes 1,1-bis(4-hydroxyphenyl)cyclohexane residue, conforming to formula B

B in which n denotes 1 to 10, preferably 1 to 5, particularly preferably 1 to 3, very particularly preferably 3 and the substituents R mutually independently denote any desired substituents, preferably an alkyl, alkenyl, aryl (preferably phenyl) or halogen radicals, preferably an alkyl radical, particularly alkyl radical with 1 to 10 carbon atoms, very particularly preferably alkyl radical with 1 to 5 carbon atoms and in particular alkyl radical with 1 to 3 carbon atoms, methyl and most especially the instances where the several R substituents represent the same residue, and k denotes an integer between 1 and 4000, preferably between 2 and 2000, particularly preferably between 2 and 1000 and very particularly preferably between 2 and 500 and in particular preferably between 2 and 300, o denotes numbers between 1 and 4000, preferably between 1 and 2000, particularly preferably between 1 and 1000 and very particularly preferably between 1 and 500 and in particular preferably between 1 and 300, and m denotes a fraction z/o and n denotes a fraction (o-z)/o, wherein z denotes numbers between 1 and o.

Very particularly preferred structural units of the linear polyformals or copolyformals according to the invention are derived from general structures of the formulae (4a) and (4b), (4a)

(4b)

wherein A independently denotes hydrogen or phenyl, preferably hydrogen and the expression inside the brackets describe the diphenolate residues, in which R1 and R2 mutually independently denote H, linear or branched $C_1$–$C_{18}$ alkyl or alkoxy radicals, halogen such as Cl or Br or an optionally substituted aryl or aralkyl radical, preferably H or linear or branched $C_1$–$C_{12}$ alkyl, particularly preferably H or $C_1$–$C_8$ alkyl radicals and very particularly preferably H or methyl, X denotes a single bond or —$SO_2$—, —CO—, —S—, —O—, a $C_1$ to $C_6$ alkylene, preferably $C_1$ to $C_3$ alkylene and particularly preferably a methylene residue; a $C_2$ to $C_5$ alkylidene, preferably a $C_2$ to $C_3$ alkylidene residue; a $C_5$ to $C_6$ cycloalkylidene, preferably a cyclohexyl residue, which may be substituted with $C_1$ to $C_6$ alkyl, preferably methyl or ethyl radicals, or a $C_6$ to $C_{12}$ arylene radical, which may optionally be fused with aromatic rings containing further heteroatoms, wherein p denotes an integer between 1 and 4000, preferably between 2 and 2000, particularly preferably between 2 and 1000 and very particularly preferably between 2 and 500 and in particular between 2 and 300, and q denotes a fraction z/p and r a fraction (p-z)/p, wherein z denotes numbers between 1 and p.

The variable diphenolate residues in the formulae (3) and (4) are likewise particularly preferably derived from the suitable diphenols additionally stated below.

Examples of the diphenols underlying the general formulae (3) and (4) which may be stated are hydroquinone, resorcinol, dihydroxybiphenyls, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, 4,4'-dihydroxydiphenyl ethers, 3,3'-dihydroxydiphenyl ethers, 3,4'-dihydroxydiphenyl ethers, α,α'-bis(hydroxyphenyl)diisopropylbenzenes, and the ring-alkylated and ring-halogenated compounds thereof, and also α,ω-bis(hydroxyphenyl) polysiloxanes.

Preferred diphenols are for example 4,4'-dihydroxybiphenyl (DOD), 2,2-bis(4-hydroxyphenyl)propane (bisphenol A), 1,1-bis(4-hydroxyphenyl)-3,3,5-trimethylcyclohexane (bisphenol TMC), 1,1-bis(4-hydroxyphenyl)cyclohexane, 2,4-bis(4-hydroxyphenyl)-2-methylbutane, 1,1-bis(4-hydroxyphenyl)-1-phenylethane, 1,3-bis[2-(4-hydroxyphenyl)-2-propyl]benzene (bisphenol M), 1,3-bis[2-(4-hydroxyphenyl)-2-propyl]benzene (bisphenol M), 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)-propane, bis(3,5-dimethyl-4-hydroxyphenyl) sulphone, 2,4-bis(3,5-dimethyl-4-hydroxyphenyl)-2-methylbutane, 2,2-bis(3,5-dichloro-4-hydroxyphenyl)propane and 2,2-bis(3,5-dibromo-4-hydroxyphenyl)propane.

Particularly preferred diphenols are for example 2,2-bis(4-hydroxyphenyl)propane (bisphenol A), 4,4'-dihydroxybiphenyl (DOD), 1,3-bis[2-(4-hydroxyphenyl)-2-propyl]benzene (bisphenol M), 2,2-bis(3,5-dimethyl-4-hydroxyphenyl)propane, 1,1-bis(4-hydroxyphenyl)-1-phenylethane, 2,2-bis(3,5-dichloro-4-hydroxyphenyl)-propane, 2,2-bis(3,5-dibromo-4-hydroxyphenyl)propane, 1,1-bis(4-hydroxyphenyl)-cyclohexane and 1,1-bis(4-hydroxyphenyl)-3,3,5-trimethylcyclohexane (bisphenol TMC).

Very particularly preferred compounds are 2,2-bis(4-hydroxyphenyl)propane (bisphenol A), 4,4'-dihydroxybiphenyl (DOD), 1,3-bis[2-(4-hydroxyphenyl)-2-propyl]benzene (bisphenol M) and 1,1-bis(4-hydroxyphenyl)-3,3,5-trimethylcyclohexane (bisphenol TMC).

Especially preferred compounds are 2,2-bis(4-hydroxyphenyl)propane (bisphenol A) and 1,1-bis(4-hydroxyphenyl)-3,3,5-trimethylcyclohexane (bisphenol TMC).

The diphenols may be used both alone and as a mixture; both homopolyformals and copolyformals are included. The diphenols are known from the literature or may be produced using processes known from the literature (c.f. for example. H. J. Buysch et al., Ullmann's Encyclopedia of Industrial Chemistry, VCH, New York 1991, 5th ed., vol. 19, p. 348).

The present invention provides the use of linear polyformals or copolyformals of the formulae (3a) and (3b) for the production of products by the injection molding or extrusion process and for the production of film. They are preferably used in the injection molding or extrusion process, particularly preferably for the production of optical data storage media and medical articles.

The present invention also provides the polyformals and copolyformals of the formulae 3a and 3b themselves.

The present invention furthermore relates to a process for the production of polyformals and copolyformals of the formulae (3a) and (3b), characterized in that bisphenols and chain terminators are reacted in a homogeneous solution of methylene chloride or alpha,alpha-dichlorotoluene and a suitable high-boiling solvent such as for example N-methylpyrrolidone (NMP), dimethylformamide (DMF), dimethyl sulphoxide (DMSO), N-methylcaprolactam (NMC), chlorobenzene, dichlorobenzene, trichlorobenzene or tetrahydrofuran (THF) in the presence of a base, preferably sodium hydroxide or potassium hydroxide, at temperatures of between 30 and 160° C. Preferred high-boiling solvents are NMP, DMF, DMSO and NMC, particularly preferably NMP, NMC, DMSO and very particularly preferably NMP and NMC. The reaction may also be performed in multiple stages. The optionally necessary separation of the cyclic impurities proceeds, once the organic phase has been washed to neutrality, by a precipitation process in, or by a fractional kneading process of the crude product with a solvent, for example acetone, which dissolves the cyclic compounds. The cyclic impurities virtually completely dissolve in the solvent and may be almost completely separated by kneading in portions and changing the solvent. For example, by using approx. 10 liters of acetone, which is added in, for example, 5 portions to a quantity of polyformal of approx. 6 kg, it is possible to achieve a content of cycles after kneading of distinctly below 1%.

The cyclic polyformals and copolyformals may also be separated by a precipitation process in suitable solvents which act as a non-solvent for the desired polymer and as a solvent for the unwanted cycles. These preferably comprise alcohols or ketones.

Bisphenols should be taken to mean the above-stated diphenols. The second reactants comprise, for example, methylene chloride or alpha,alpha-dichlorotoluene.

The reaction temperature is 30° C. to 160° C., preferably 40° C. to 100° C., particularly preferably 50° C. to 80° C. and very particularly preferably 60° C. to 80° C.

The molecular weights Mw of the branched polyformals and copolyformals according to the invention are in the range from 600 to 1000000 g/mol, preferably between 600 and 500000 g/mol, particularly preferably between 600 and 250000/mol and very particularly preferably between 600 and 120000 g/mol and in particular between 600 and 80000 g/mol (determined by means of GPC and polycarbonate calibration).

Preferred, particularly preferred or very particularly preferred embodiments are those which make use of parameters, compounds, definitions and explanations which are stated to be preferred, particularly preferred or very particularly preferred, preferential etc.

The definitions, parameters, compounds and explanations stated in the description or in preferential ranges may, however, also be combined together at will, i.e. between the particular ranges and preferential ranges.

The polyformals and copolyformals according to the invention may be worked up in known manner and processed into any molded articles, for example by extrusion or injection molding. Films may also be produced by the solution or extrusion process.

Other polymers such as for example aromatic polycarbonates and/or other aromatic polyester carbonates and/or other aromatic polyesters may be blended in known manner with the polyformals and copolyformals according to the invention.

The additives conventional for thermoplastics such as fillers, UV stabilisers, heat stabilisers, antistatic agents and pigments or colorants may be added in conventional quantities to the polyformals and copolyformals according to the invention; demolding behaviour, flow behaviour, and/or flame resistance may optionally additionally be improved by the addition of external mold release agents such as glycerol monostearate (GMS), PETS or fatty acid esters, rheological agents and/or flame retardants (for example alkyl and aryl phosphites, phosphates, phosphanes, low molecular weight carboxylic acid esters, halogen compounds, salts, chalk, silica flour, glass and carbon fibers, PTFE or PTFE-containing blends, pigments and combinations thereof. Such compounds are described, for example, in WO 99/55772, pages 15–25, and in the corresponding chapters of "Plastics Additives Handbook", ed. Hans Zweifel, 5$^{th}$ edition 2000, Hanser Publishers, Munich).

The polyformals and copolyformals according to the invention, optionally blended with other thermoplastics and/or conventional additives, may, once processed into any molded articles/extrudates, be used in any applications in which already known polycarbonates, polyester carbonates and polyesters are used. Thanks to their range of properties, they are in particular suitable as substrate materials for optical data storage media such as for example CD, CD-R, DVD, DVD-R, Blu-ray Discs (BD) or Advanced Optical Discs (AOD) and for near-field optics.

Another suitable area of application, determined by the extraordinarily good hydrolysis resistance, is medical articles, which are frequently steam sterilized. Such articles are, for example, dialysers, cardiotomy reservoirs, oxygenator housings, plate and hollow fiber dialyzers, separator housings, injection systems, inhalers, tube connectors, three-way taps, injection spacers and other components.

Further examples of the use of the polyformals according to the invention are:

Safety panels which, as is known, are required in many areas of buildings, vehicles and aircraft, and as helmet visors.

1. Production of films, for example ski films.
2. Light-transmitting sheets, in particular cellular sheets, for example for roofing buildings such as stations, greenhouses and for lighting systems.
3. Production of optical data storage media.
4. For the production of traffic light housings or traffic signs.
5. For the production of foams (c.f. for example DE-B 1 031 507).
6. For the production of yarns and filaments (c.f. for example DE-B 1 137 167 and DE-A 1 785 137).
7. As translucent plastics with a content of glass fibers for lighting applications (c.f. for example DE-A 1 554 020).
8. As translucent plastics with a content of barium sulphate, titanium dioxide and/or zirconium oxide or organic polymeric acrylate rubbers (EP-A 634 45, EP-A 269324) for the production of light-transmitting and light-scattering moldings.
9. For the production of precision injection moldings, such as for example lens mountings. The polyformals used for this purpose have a content of glass fibers and optionally additionally approx. 1–10 wt. % of $MoS_2$, relative to total weight.
10. For the production of optical instrument parts, in particular lenses for still and video cameras (c.f. for example DE-A 2 701 173).
11. As light transmission substrates, in particular optical fiber cables (c.f. for example EP-A 0 089801).
12. As electrical insulating materials for electrical conductors and for plug sockets and connectors.
13. Production of mobile telephone casings with improved resistance to perfume, aftershave and sweat.
14. Network interface devices.
15. Substrate materials for organic photoconductors.
16. For the production of torches and lamps, such as strip lights or headlight/spotlight lamps, diffuser disks or internal lenses.
17. For medical applications, for example oxygenators, dialysers.
18. For foodstuff applications, such as for example bottles, crockery and chocolate molds.
19. For automotive applications where contact with fuels and lubricants may occur, such as for example bumpers, optionally in the form of suitable blends with ABS or suitable rubbers.

20. For sports articles such as for example slalom poles, ski boot fasteners.
21. For household articles such as for example kitchen sinks and letter boxes.
22. For housings, such as for example electrical distribution cabinets.
23. Housings for electric toothbrushes and hair dryer housings.
24. Transparent washing machine portholes with improved resistance to the washing solution.
25. Safety glasses, optical vision correcting glasses.
26. Lamp covers for cooking installations with improved resistance to cooking vapours, in particular oil vapours.
27. Packaging films for pharmaceutical preparations.
28. Chip boxes and chip carriers.
29. For other applications such as stall-feeding doors or animal cages.

The molded articles and optical data storage media made from polymer according to the invention are also provided by the present application.

The following Examples are intended to illustrate the invention, but without restricting its scope.

EXAMPLES

Example 1

Synthesis of Homopolyformal from Bisphenol TMC:

7 kg (22.55 mol) of bisphenol TMC, 2.255 kg (56.38 mol) of sodium hydroxide flakes and 51.07 g (0.34 mol) of finely ground p-tert-butylphenol (Aldrich) in 500 l of methylene chloride are added with stirring under a protective nitrogen atmosphere to a solvent mixture of 28.7 kg of methylene chloride and 40.18 kg of N-methyl-2-pyrrolidone (NMP). After homogenization, the mixture is heated to reflux (78° C.) and stirred for one hour at this temperature. After cooling down to 25° C., the reaction batch is diluted with 35 l of methylene chloride and 20 l of demineralised water. The batch is washed with water in a separator until neutral and free of salt (conductivity <15 $\mu S.cm^{-1}$). The organic phase from the separator is separated and solvent exchange is performed in an evaporator tank, methylene chloride being replaced with chlorobenzene. The material is then extruded through a ZSK 32 devolatilizing extruder at a temperature of 270° C. with subsequent pelletisation. This synthesis procedure is performed twice. After discarding the initial material, a total of 9.85 kg of polyformal are consequently obtained as transparent pellets. This product still contains low molecular weight rings as impurities. The material is divided into two parts and each part is swollen overnight with approx. 5 l of acetone. The resultant masses are kneaded with several portions of fresh acetone until no rings can any longer be detected. After combining the purified material and dissolving it in chlorobenzene, extrusion is again performed through the devolatilizing extruder at 280° C. After discarding the initial material, a total of 7.31 kg of polyformal are consequently obtained as transparent pellets.

Analysis:

Molecular weight Mw=38345, Mn=20138, D=1.90 according to GPC (calibration against polycarbonate).

Glass transition temperature Tg=170° C.

Relative solution viscosity in methylene chloride (0.5 g/100 ml of solution)=1.234

Example 2

Homopolyformal Prepared from Bisphenol A:

7 kg (30.66 mol) of bisphenol A (Bayer AG), 3.066 kg (76.65 mol) of sodium hydroxide flakes and 69.4 g (0.462 mol) of finely ground p-tert-butylphenol (Aldrich) in 500 ml methylene chloride are added with stirring under a protective nitrogen atmosphere to a solvent mixture of 28.7 kg of methylene chloride and 40.18 kg of N-methyl-2-pyrrolidone (NMP). After homogenization, the mixture is heated to reflux (78° C.) and stirred for one hour at this temperature. After cooling down to 25° C., the reaction batch is diluted with 20 l of methylene chloride and 20 of demineralised water. The batch is washed with water in a separator until neutral and free of salt (conductivity <15 µS.cm$^{-1}$). The organic phase from the separator is separated and solvent exchange is performed in an evaporator tank, methylene chloride being replaced with chlorobenzene. The material is then extruded through a ZSK 32 devolatilizing extruder at a temperature of 200° C. with subsequent pelletisation. This synthesis procedure is performed twice. After discarding the initial material, a total of 11.99 kg of polyformal are consequently obtained as transparent pellets.

Analysis:
  Molecular weight Mw=31732, Mn=3465, according to GPC (calibration against polycarbonate). The cycles were not separated in this case. The material cannot be swollen with acetone and consequently separation of the cycles is likewise not possible.
  Glass transition temperature Tg=89° C.
  Relative solution viscosity in methylene chloride (0.5 g/100 ml of solution)=1.237

Example 3

Synthesis of Copolyformal from Bisphenol TMC and Bisphenol A

-continued 5.432 kg (17.5 mol) of bisphenol TMC (x=70 mol %), 1.712 kg (7.5 mol) of bisphenol A (y=30 mol %), 2.5 kg (62.5 mol) of sodium hydroxide flakes and 56.33 g (0.375 mol) of finely ground p-tert-butylphenol (Aldrich) in 500 ml of methylene chloride are added with stirring under a protective nitrogen atmosphere to a solvent mixture of 28.7 kg of methylene chloride and 40.18 kg of N-methyl-2-pyrrolidone (NMP). After homogenization, the mixture is heated to reflux (78° C.) and stirred for one hour at this temperature. After cooling down to 25° C., the reaction batch is diluted with 35 l of methylene chloride and 20 l of demineralised water. The batch is washed with water in a separator until neutral and free of salt (conductivity <15 µS.cm$^{-1}$). The organic phase from the separator is separated and solvent exchange is performed in an evaporator tank, methylene chloride being replaced with chlorobenzene. The material is then extruded through a ZSK 32 devolatilizing extruder at a temperature of 280° C. with subsequent pelletisation. After discarding the initial material, a total of 5.14 kg of copolyformal are consequently obtained as transparent pellets. This product still contains low molecular weight rings as impurities. The material is swollen overnight with approx. 5 l of acetone. The resultant mass is kneaded with several portions of fresh acetone until no rings can any longer be detected. The purified material is dissolved in chlorobenzene and extrusion is again performed through the devolatilizing extruder at 270° C. After discarding the initial material, a total of 3.11 kg of polyformal are consequently obtained as transparent pellets.

Analysis:
Molecular weight Mw=39901, Mn=19538, D=2.04 according to GPC (calibration against polycarbonate).
Glass transition temperature Tg=148° C.
Relative solution viscosity in methylene chloride (0.5 g/100 ml of solution)=1.246
$^1$NMR in CDCl$_3$ reveals the expected incorporation ratio x/y Examples 4–11

Synthesis of copolyformals from bisphenol TMC and bisphenol A with variable composition.

Further copolyformals are produced in a similar manner to the synthesis of Example 3 (c.f. Table 1).

| Example no. | TMC [mol %] | BPA [mol %] | Tg [° C.] |
|---|---|---|---|
| 4 | 30 | 70 | 115 |
| 5 | 35 | 65 | 120 |
| 6 | 40 | 60 | 124 |
| 7 | 50 | 50 | 132 |
| 8 | 55 | 45 | 137 |
| 9 | 70 | 30 | 149 |
| 10 | 80 | 20 | 158 |
| 11 | 90 | 10 | 165 |

Example 12

Determination of the Water Content of Polyformals and Copolyformals

Water absorption and determination of water content of polyformals from Examples 1–10 after storage under moist conditions, 95% r.H. and a storage temperature of 30° C.

Water content is determined after various periods of storage by means of quantitative Karl-Fischer titration (coulometric titration).

| | |
|---|---|
| Periods of storage: | 7 days and 14 days |
| Weathering: | moist conditions, 95% r.H. and 30° C. |
| Reproduction: | 4 measurements per storage condition |

Figure 1:
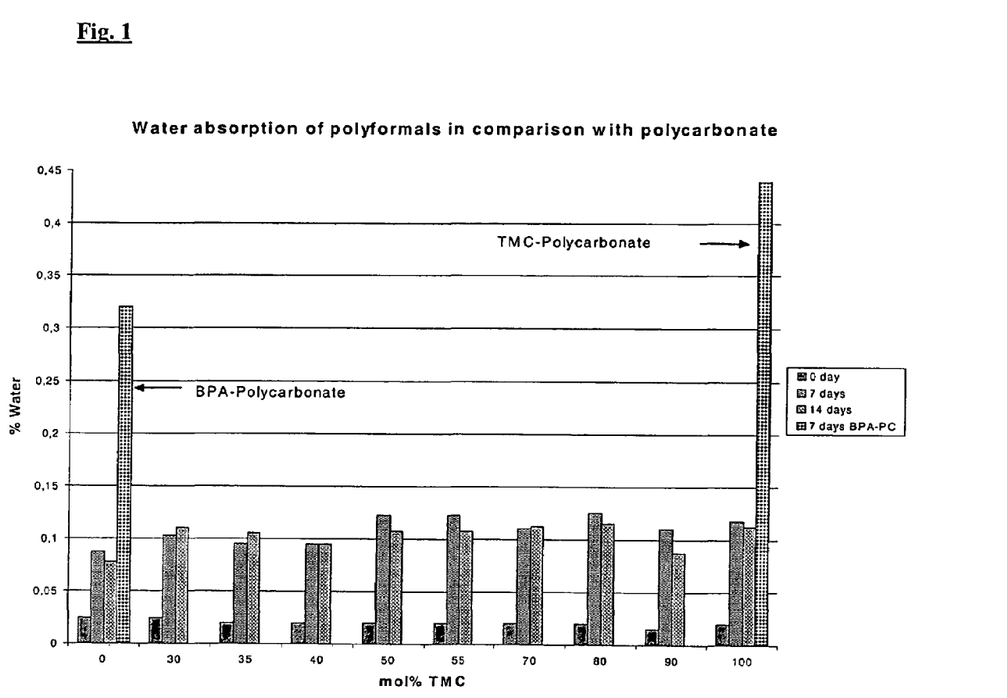
FIG. 1 shows a comparison between the polyformals and polycarbonate in terms of water absorption.

The averages of the water contents are shown in FIG. 1.

In comparison with the polycarbonates with 0% TMC-bisphenol (100% bisphenol A) and 100% TMC-bisphenol, the distinctly reduced levels of water absorption over the entire concentration range of polyformal or copolyformal copolymer composition is clearly evident.

Example 13

73.47 g (0.32 mol) bisphenol A, 32.04 g (0.8 mol) sodium hydroxide pellets are added to a mixture of 103.65 g (0.64 mol) alpha,alpha-dichlortoluene (Aldrich) and 450 ml n-methyl-2-pyrrolidone (NMP) whilst stirring in nitrogen protective gas. After homogenising, the mixture is heated to 78–83° C. and stirred for one hour at this temperature. After cooling to room temperature, the reaction mixture is diluted with methylene chloride and water. The organic phase is washed with several portions of water until neutral and salt-free. The organic phase is separated off. The polymer is isolated by precipitating out in methanol. After washing with water and methanol the cyclic oligomers are separated with hot acetone (several times of washing). After drying at 80° C. 50 g of the polyformal is obtained.

Analysis:

Molecular weight Mw=11162, Mn=7146, D 1.56 by GPC (calibration against polycarbonate)
Glass transition temperature Tg=115° C.

Example 14

40.36 g (0.13 mol) bisphenol TMC, 12.8 g (0.32 mol) sodium hydroxide pellets and 0.195 g (0.0013 mol) p-tert.

Butyl phenol are added to a mixture of 41.87 g (0.26 mol) alpha-alpha-dichlortoluene (Aldrich) and 225 ml n-methyl-2-pyrrolidone (NMP) whilst stirring in nitrogen protective gas. After homogenising, the mixture is heated to 77–81° C. and stirred for one hour at this temperature. After cooling to room temperature, the reaction mixture is diluted with methylene chloride and water. The organic phase is washed with several portions of water until neutral and salt-free. The organic phase is separated off. The polymer is isolated by precipitating out in methanol. After washing with water and methanol the cyclic oligomers are separated with hot acetone (several times of washing). After drying at 80° C. 46.6 g of the polyformal is obtained.

Analysis:

Molecular weight Mw=10644, Mn=7400, D 1.44 by GPC (calibration against polycarbonate)
Glass transition temperature Tg=158° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a linear (co)polyformal corresponding to formulae (1a) or (1b), in which A independently denotes hydrogen or phenyl, —O-D-O— and —O-E-O— independently denote a diphenolate residue, in which -E- and -D-independently denote an aromatic radical having 6 to 40 C atoms, wherein at least one of —O-D-O— and —O-E-O— denotes 1,1-bis(4-hydroxyphenyl)cyclohexane residue, k and o independently denote 1 to 4000, m denotes a fraction z/o and n a fraction (o-z)/o, wherein z denotes numbers between 1 and o, and wherein said 1,1-bis(4-hydroxyphenyl)cyclohexane residue is 1,1-bis(4-hydroxyphenyl)-3,3,5-trimethylcyclohexane.

2. A molding composition according to claim 1 wherein in formula (1a) or (1b) A denotes hydrogen.

3. A molded article comprising the thermoplastic molding composition of claim 1.

4. A molded article for medical application comprising the thermoplastic molding composition of claim 1.

5. An optical data storage medium comprising the composition of claim 1.

6. A process for the production of the molding composition of claim 1 comprising reacting at least one bisphenol with methylene chloride in a homogeneous solution in a suitable high-boiling solvent in the presence of a base, at temperatures of 30 to 160° C.

* * * * *